United States Patent [19]

Coroy

[11] Patent Number: 5,747,791
[45] Date of Patent: May 5, 1998

[54] METHOD AND DEVICES FOR WAVELENGTH AND POWER DEMODULATION BASED ON THE USE OF A QUANTUM WELL ELECTROABSORPTION FILTERING DETECTOR

[76] Inventor: Trenton G. Coroy, #103 - 1480 Pickering Parkway, Pickering, Ontario, Canada, L1V 3V7

[21] Appl. No.: 637,446

[22] Filed: Apr. 25, 1996

[51] Int. Cl.$^6$ .................................................. H01J 40/14
[52] U.S. Cl. ................ 250/214 R; 250/226; 250/214 A; 250/238
[58] Field of Search .......................... 250/226, 214 R, 250/214.1, 214 A, 214 B, 214 C, 238; 257/9, 14, 21, 184, 186, 187, 188, 189, 431, 438; 356/222, 223, 218, 221, 224, 73.1, 419, 326

[56] References Cited

U.S. PATENT DOCUMENTS

| | | | |
|---|---|---|---|
| 4,332,469 | 6/1982 | Wendland | 356/222 |
| 4,782,223 | 11/1988 | Suzuki | 250/214 R |
| 4,800,262 | 1/1989 | Lentine | 257/22 |
| 4,915,482 | 4/1990 | Collins et al. | |
| 4,978,910 | 12/1990 | Knox et al. | |
| 5,311,278 | 5/1994 | Rosencher | 356/326 |
| 5,319,435 | 6/1994 | Melle et al. | 356/32 |
| 5,410,145 | 4/1995 | Coroy | 250/214 C |
| 5,428,225 | 6/1995 | Silva et al. | 257/14 |
| 5,469,265 | 11/1995 | Measures et al. | 356/419 |
| 5,581,077 | 12/1996 | Chirovsky et al. | 250/214 R |

OTHER PUBLICATIONS

Optoelectronics, Spectrodetector –Novel Monolithic Wavelength Meter and Photodetector, Optics & Photonics News/ Dec. 1995, p. 12.

Wavelength–selective voltage–tunable photodector made from multiple quantum wells; 3 pages, T.H. Wood, C.A. Burrus, A. H. Gnauck and J. M. Wiesenfeld, *AT&T Bell Laboratories, Crawford Hill Laboratory, Holmdel, New Jersey* 07733; D.A.B. Miller, D.S. Chemla and T.C. Damen, *AT&T Bell Laboratories, Holmdel, New Jersey* 07733 received 26 Apr. 1985; accepted for publication 14 May 1985.

*Primary Examiner*—Edward P. Westin
*Assistant Examiner*—John R. Lee
*Attorney, Agent, or Firm*—Lynn C. Schumacher; Dowell & Dowell

[57] ABSTRACT

Devices for measuring one or more properties of a light signal is disclosed. More particularly the invention relates to devices for wavelength and power demodulation based on the use of quantum well electroabsorption photodiodes. In one aspect the invention provides and power and wavelength demodulation system based on a quantum well electroabsorption (QWEA) filtering detector. The input optical signal passes through an optical beam splitter with part of the signal input into a filtering detector which is a multiple quantum well electroabsorption (MQW EA) photodiode having a tunable bandgap and the other part into a reference detector. The input light signal is impinged on the QW diode perpendicular to the plane of the quantum wells. The output of filtering detector is amplified by an amplifier and the output of the reference detector is input into another amplifier. The output from reference detector amplifier serves as a measurement of the power of the input optical signal. The outputs of the amplifiers are input into an analog divider circuit where the signals are ratioed. A ratiometric voltage signal, $V_{ratio}$, is obtained by ratioing the filtered output of filtering detector and the unfiltered reference output to provide optical intensity self-referencing (immunity to input power fluctuations). This $V_{ratio}$ output signal is continuously compared with a reference voltage signal, $V_{ref}$ and the difference of $V_{ratio}$ and $V_{ref}$ is input into a feedback control circuit. The output voltage $V_{out}$ of the feedback control circuit is used to bias the QW EA photodiode so that in closed loop operation the OW EA photodiode is continuously wavelength tuned to maintain $V_{ratio}$ equal to $V_{ref}$

33 Claims, 9 Drawing Sheets

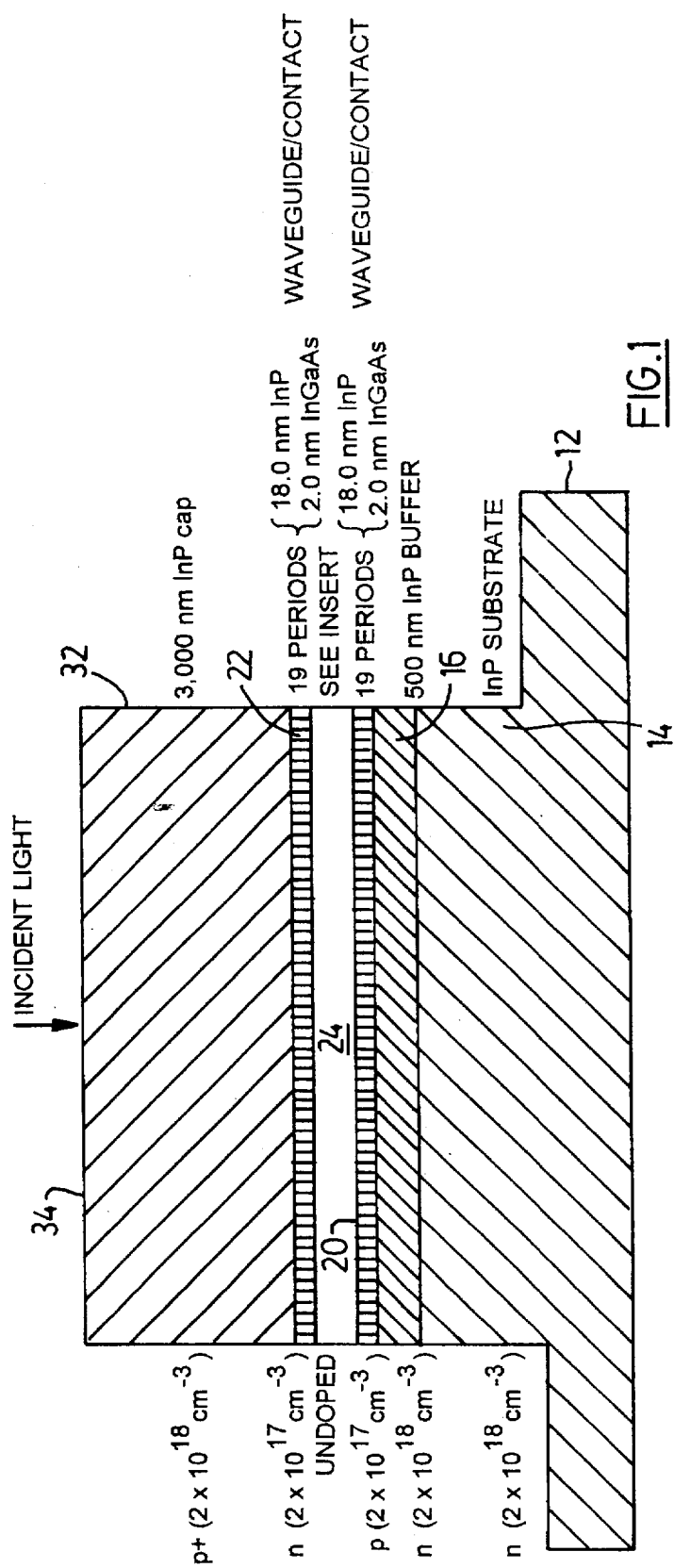
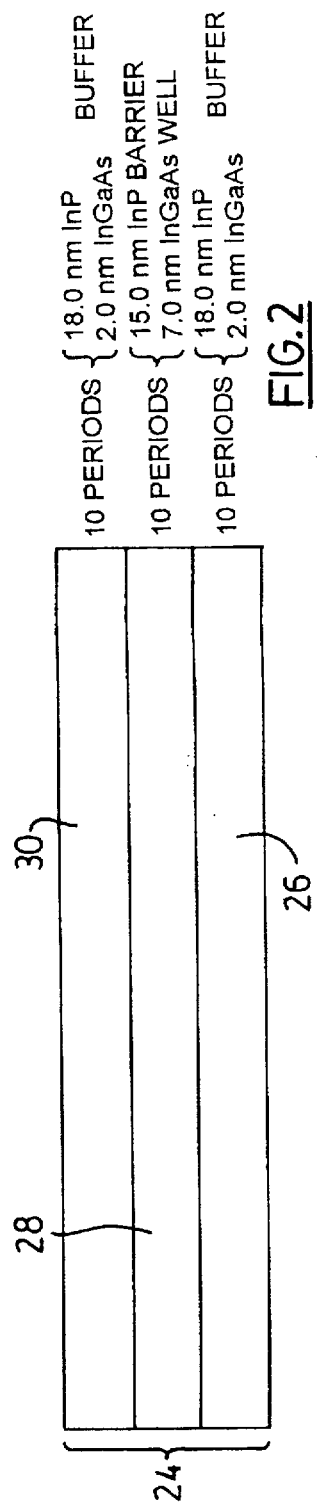
FIG.1
FIG.2

METHOD AND DEVICES FOR WAVELENGTH AND POWER DEMODULATION BASED ON THE USE OF A QUANTUM WELL ELECTROABSORPTION FILTERING DETECTOR

FIELD OF THE INVENTION

The present invention relates to devices for measuring one or more properties of a light signal. More particularly the invention relates to devices for wavelength and power demodulation based on the use of quantum well electroabsorption photodiodes.

BACKGROUND OF THE INVENTION

The concept of an "optical multimeter", most simply defined as a device that measures more than one aspect of an input light signal, has received increasing attention in the last few years. The possibility of having one measurement device report on the power, wavelength, polarization and the like is extremely attractive, and in the future, such optical multimeters may become as basic to the photonics industry as the digital multimeter has become to the electronics industry.

Recently, systems for wavelength measurement have been proposed which make use of quantum well electroabsorption devices as wavelength tunable filters or as wavelength tunable filtering detectors, as disclosed in U.S. Pat. No. 5,469,265. Applying an electric field across the quantum well region of the photodiode results is a shift in the optical absorption edge of the quantum well structure, in accordance with the quantum confined Stark effect, so that the wavelength characteristics of these devices may be tuned.

However, proposed systems to date have focussed on the waveguide approach with input light signal being coupled into the thin waveguide region of the photodiode and travelling parallel to the quantum well in the plane of the well layers. This approach is advantageous in many applications but suffers from two problems which make it undesirable for use in development of commercial optical multimeters. First, the waveguide approach is polarization dependent. Specifically, the quantum confined Stark effect is sensitive to whether or not the electric field is polarized parallel or perpendicular to the plane of the quantum wells, resulting in distinct TE and TM behavior.

Secondly, optical alignment of the input light signal with the quantum wells is problematic. The cross sectional dimensions semiconductor waveguides are typically of the order of a few microns, so that optical coupling of light into the waveguide is a very challenging alignment problem requiring extremely fine positioning and good stability of the input light signal with respect to the waveguide.

In order to facilitate the development of optical multimeters based on quantum well electroabsorption devices, alternative device architectures must be identified which offer the potential for simple, flexible and low cost measurement of more than one characteristic of a light signal, while avoiding problems polarization sensitivity and optical alignment of the input light signal.

SUMMARY OF THE INVENTION

It is an object of the present invention to provide a device for measuring one or more characteristics of a light signal.

It is also an object of the present invention to provide a device for measuring one or more characteristics of a light signal which does not require precision alignment between the detector and the input light signal and which is not limited by light polarization restrictions.

The present invention provides a device for measuring properties of an input light signal. The device includes a light signal detection means comprising a quantum well photodiode having at least one planar quantum well and an absorption edge with the light signal detection means having an output. Included is a reference detection means having an output forms part of the device and means for impinging a portion of an input light signal on the reference detection means and another portion of the input light signal on the light signal detection means at an effective angle with respect to the planar quantum well. The device includes a signal processing means with the outputs of the light signal detection means and reference detection means being connected to the signal processing means which combines the outputs in a preselected manner. The signal processing means has an output signal indicative of the combined outputs. The device includes a biasing means for biasing the quantum well photodiode for tuning the absorption edge of the quantum well photodiode. In this aspect of the invention the effective angle is substantially perpendicular to the plane of the quantum well.

In another aspect of the invention there is provided a device for measuring properties of a light signal. The device comprises a filtering detector which comprises a quantum well photodiode having an absorption edge, at least one substantially planar quantum well and an output. The device includes a reference photodetector having an output and a means for impinging a portion of an input light signal on the reference photodetector and another portion of the input light signal on the quantum well photodiode at an angle substantially perpendicular to the planar quantum well. The device includes a signal processing means with the outputs of the filtering detector and the reference photodector being connected to the signal processing means which combines the outputs in a preselected manner. The signal processing means has an output signal indicative of the combined outputs. The device includes biasing means for biasing the quantum well photodiode for tuning the absorption edge of the quantum well photodiode.

BRIEF DESCRIPTION OF THE DRAWINGS

The method and devices for wavelength and power demodulation using quantum well electroabsorption filtering detectors forming the subject invention will now be described, by example only, reference being had to the accompanying drawings, in which:

FIG. 1 is a cross sectional view of a multiple quantum well photodiode forming part of a quantum well electroabsorption detector according to the present invention;

FIG. 2 is a detailed view of the undoped sandwich layer of FIG. 1;

DETAILED DESCRIPTION OF THE INVENTION

Figure 3:
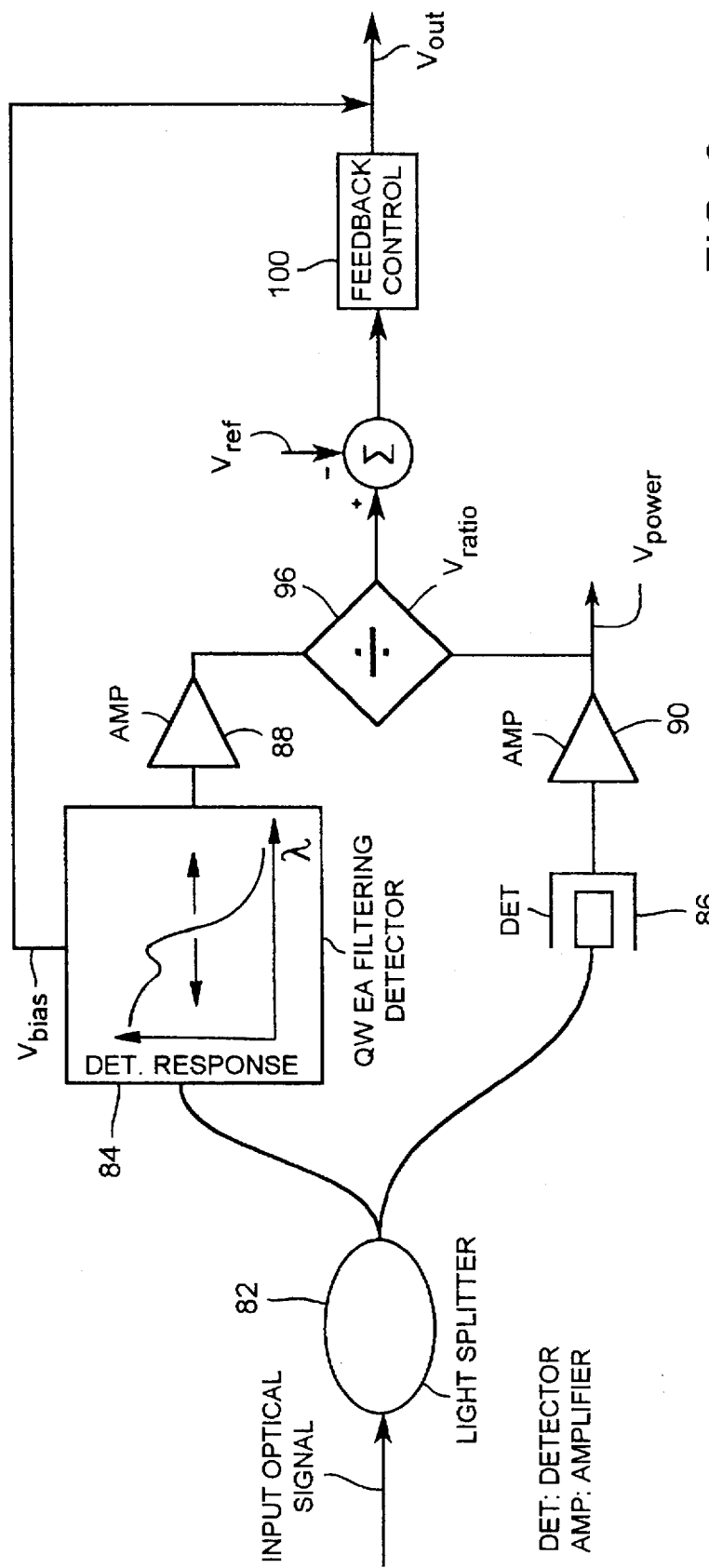
FIG. 3 is a block diagram of a divider based system which makes use of a quantum well electroabsorption filtering detector to measure the wavelength of an optical signal.

The quantum well electroabsorption (QW EA) filtering detectors constructed in accordance with the present invention make use of multiple (or single) quantum well (QW) photodiodes, whose spectral response near the absorption edge may be tunable utilizing the quantum confined Stark effect by applying a variable reverse bias voltage across the photodiode. The principle of this method of wavelength demodulation system is briefly discussed in U.S. Pat. No. 5,469,265 issued Nov. 21, 1995 to Measures et al which is incorporated herein by reference.

Referring to FIG. 1, a cross sectional view is shown of an example quantum well photodiode at 10. Photodiode 10 is a layered semiconductor structure comprising an n-doped indium phosphide (InP) substrate 12 with an n-doped portion 14 on which a 500 nm of n-doped InP buffer layer 16 is applied followed by a lower n-doped waveguide contact 20 comprising nineteen periods of 2.0 nm InGaAs/18.0 nm InP layers. An upper p-doped waveguide contact 22 comprises nineteen periods of 2.0 nm InGaAs/18.0 nm InP layers suitably doped. Interposed between the two waveguide contacts 20 and 22 is an undoped layer 24 to be discussed hereinafter. On top of the upper waveguide contact 22 is located a p-doped layer 32 of InP. Thickness and doping levels of the different layers is indicated in FIG. 1 adjacent to the associated layers. Similarly, the detailed view of FIG. 2 gives the thickness and composition of the periods forming the undoped layer 24. Shown are three different layers, lower and upper layers 26 and 30 and central layer 28 sandwiched between layers 26 and 30. Each layer comprises ten periods each with different thicknesses and compositions as indicated. QW photodiode 10 has a substantially planar upper surface 34 onto which the input light signal is incident during use. This particular QW photodiode was produced by Lucent Technologies-Bell Labs.

The center layer 28 of the undoped region is the portion of the quantum well photodiode in which light absorption in the region of the absorption edge takes place. The materials and structure of this portion of the photodiode have been chosen to produce the tunable wavelength response of FIG. 7, discussed hereinafter. It will be understood by those skilled in the art that the semiconductor materials and structure of the QW photodiodes may be chosen in various number of ways to produce photodiodes optimized for tunable wavelength measurement over preselected wavelength ranges in addition to other properties. A bias potential is shown applied to photodiode and this bias potential may be an externally applied potential or it may be part of a feedback loop of which the filtering detector forms a part, depending on the particular application to be discussed hereinafter.

Using a QW EA photodiode in an orientation such as is shown in FIG. 1 with light incident substantially normal to the plane of the quantum wells offers two distinct advantages for optical multimeter (and other) applications compared to the waveguide approach. First, because the electric field vector of light is always aligned parallel to the plane of the quantum wells, the device is independent of polarization effects. This is in contrast to waveguide devices which are characterized by distinct TE and TM polarization responses previously discussed. A second advantage is that there is no need to couple light into a very thin waveguide, The input light signal may be incident over a large surface area, in the photodiode shown in FIG. 1, over the entire surface 34 of the diode. Such an approach facilitates coupling of the input light signal to areas which may be of diameter of hundreds of microns in size, dramatically simplifying optical coupling to the QW EA device, and thus increasing robustness of the system and decreasing packaging costs.

Unfortunately, only a small portion of the incident light is absorbed by the filtering detector, since the absorbing region is only as long as the width of the quantum wells and because it is difficult to grow large numbers of successive OW layers. For this reason, known QW EA modulators are generally limited to waveguide structures where the light is incident "edge on", parallel to the plane of the quantum wells. However, when using these devices as filtering detectors this low absorption means that the detector responses will be lower in amplitude than for standard detectors. It is in this manner that QW EA devices may best be used for optical multimeter applications.

In practice, such OW photodiodes may be designed for various applications, such as for operating in different wavelength ranges, light intensity sensitivities and wavelength resolution. For example, for measurement of very low light intensities, multiple QW photodiodes are preferred while for measurement of higher light intensities a single QW photodiode may be used. Measurements requiring high resolution would preferably use a single QW device, as multiple QW structures typically exhibit less steep wavelength filter slopes than do single QW structures. Therefore, the particular details of the MQW device of FIGS. 1 and 2 are given as a non-limiting example only.

FIG. 3 illustrates a block schematic diagram of a wavelength demodulation system based on a quantum well electroabsorption (QWEA) filtering detector at 40. The input optical signal passes through an optical beam splitter 82 with part of the signal input into a multiple quantum well electroabsorption (MQW EA) tunable filtering detector 84 and the other part into a reference detector 86 which can be either a known photodiode detector or it also may be a QW photodiode depending on the application. The output of filtering detector 84 is amplified by means of an amplifier 88 and the output of reference detector 86 is input into an amplifier 90. The output from amplifier 90 serves as a measurement of the power of the input optical signal. The outputs of amplifiers 88 and 90 are input into an analog divider circuit 96 where the signals are ratioed. A ratiometric voltage signal, $V_{ratio}$, is obtained by ratioing the filtered output of filtering detector 84 and the unfiltered reference output of detector 86 to provide optical intensity self-referencing (immunity to input power fluctuations). This $V_{ratio}$ output signal is continuously compared with a reference voltage signal, $V_{ref}$ and the difference of $V_{ratio}$ and $V_{ref}$ is input into a feedback control circuit 100. The output voltage $V_{out}$ of the feedback control circuit 100 is used to bias the QW EA photodiode so that in closed loop operation the QW EA photodiode is continuously wavelength tuned to maintain $V_{ratio}$ equal to $V_{ref}$. This process will be discussed in more detail with respect to the detector of FIG. 5.

The feedback control in the system of FIG. 3 may also be disconnected, and the ratiometric signal from the divider used to determine the wavelength of an input optical signal, provided the spectral characteristics of the quantum well photodiode in detector 84 are well characterized. The use of the quantum well photodiode in such an open loop version of the device of FIG. 3 represents a significant advance over similar ratiometric wavelength measurement techniques to date, since the absorption edge of the photodiode may be tuned over a range of wavelengths, providing a greater wavelength measurement range than would be possible using many non-tunable filters. Furthermore, systems which rely on passive filters inherently suffer from a trade-off between measurement range and resolution, corresponding to low and high filter slopes (with respect to wavelength) respectively. In contrast, the tunable filter based detectors forming the present invention allow high filter slopes to be maintained over an extended measurement range achieved by wavelength tuning the filter.

Figure 4:
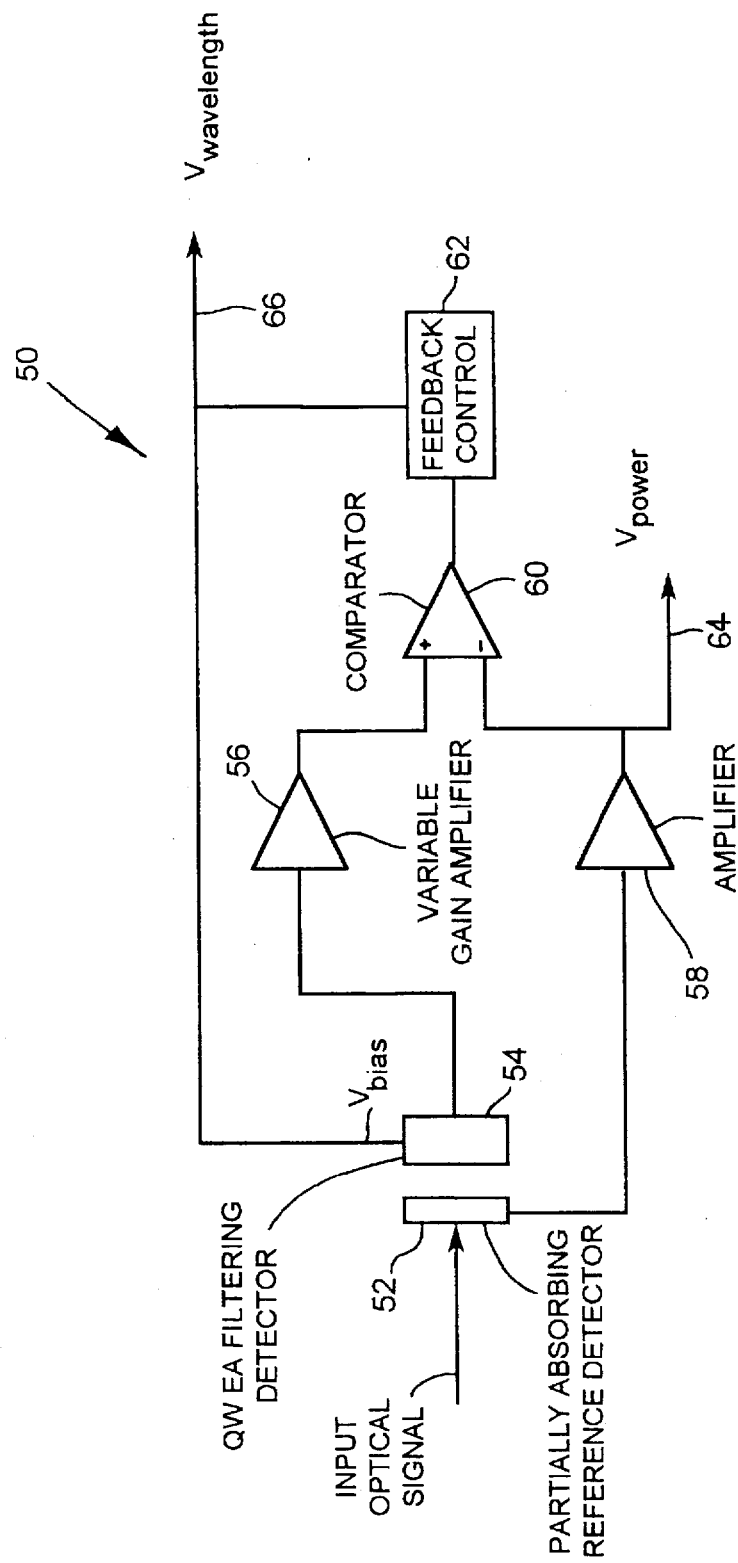
FIG. 4 is a block diagram of a comparator based system which uses a quantum well electroabsorption filtering detector to measure the wavelength and power of an optical signal.

FIG. 4 is a block diagram of another embodiment for a QW EA filtering detector based wavelength and power demodulation system 50. The optical receiving portion of system 50 comprises a QW EA filtering detector 54 and a reference detector 52, each of which receives a portion of the input optical signal. Reference detector 52 is only partially absorbing, and the remaining light passing through it is input to filtering detector 54. The output of reference detector 52 and filtering detector 54 are input into an amplifier 58 and a variable amplifier 56 respectively. The output of amplifier 58 provides a measurement of the power of the input signal, $V_{power}$ 64.

The outputs of amplifiers 56 and 58 are fed into a comparator circuit 60 the function of which is to provide a high (positive) signal state if the signal from amplifier 56 is greater than the signal from amplifier 58, or a low (negative) signal state if the signal from amplifier 56 is less than the signal from amplifier 58. Comparator circuit 60 may for example be a high gain differential amplifier.

The output from comparator 60 is input into a feedback control circuit 62. The output voltage $V_{wavelength}$ of the feedback control circuit 62 is used to bias, and therefore wavelength tune, the QW EA photodiode in filtering detector 54, so that in operation the QW EA photodiode is continuously wavelength tuned to maintain the comparator output at zero volts, that is, to maintain the outputs of amplifiers 56 and 58 substantially equal. The output of feedback control circuit 62 also serves as the output of the detection system, $V_{wavelength}$, with different outputs corresponding to different input signal wavelengths.

The comparator based system 50 of FIG. 4 operates in an analagous manner to the system of FIG. 3 working in closed loop (tracking) mode. Intensity self-referencing is accomplished so long as the system is "locked" with amplifiers 56 and 58 giving the same output.

The configuration of system 50 in FIG. 4 eliminates the need for splitter 82 as is used in device 40 in FIG. 3. However, it will be understood that a beam splitter may be used in this configuration as well. Likewise, an in-line detector approach could be used in the system of FIG. 3 just as it is in FIG. 4. It will be understood by those skilled in the art that wavelength measurement could also be effected using a configuration in which either or both of the detectors 52 and 54 are QW detectors. Also, the two detectors could be integrated into a single device with one photodiode detector grown on top of the other. Similarly, in the system 40 of FIG. 3, either or both of the detectors may be quantum well photodiode detectors. However, it will be appreciated that when optical power is one of the characteristics to be measured in addition to a wavelength measurement, the architectures disclosed herein are preferred because they permit measurement of optical power in a straightforward manner.

In system 40 shown in FIG. 31 the point of edge locking on the detector response spectrum may be chosen by adjusting the value of $V_{ref}$. In system 50 shown in FIG. 4, the edge-locking point is chosen by adjusting the gain of the variable amplifier 56. It will be understood that it is preferable to have amplifier 56 at the output of the filtering detector 54 as the variable gain amplifier. However, amplifier 58 could be the variable gain amplifier but this would complicate the optical power measurement since it would vary $V_{power}$. Also, the analog divider 96 in system 40 has been replaced by a simpler and potentially faster comparator 60. The feedback controller 62 is typically a known P.I.D. (proportional integration differentiation) controller, with the simplest version being just an integrator circuit. It should be noted that some applications will be better suited to the divider based system 40 in FIG. 3, while others will be better suited to comparator based device 50 of FIG. 4.

For example, in an application where open circuit (non-tracking, no negative feedback is used) operation is desirable, a divider based circuit is used since the comparator circuit works only for tracking. It is to be noted that, in general, closed loop (tracking) systems have been found to offer better wavelength resolution than open loop systems. Open loop systems however have the best potential for measuring wavelength signals which vary at high frequencies. Of the two approaches to tracking, the system based on the comparator may be advantageous due to speed limitations inherent in analog divider circuits.

Figure 5:
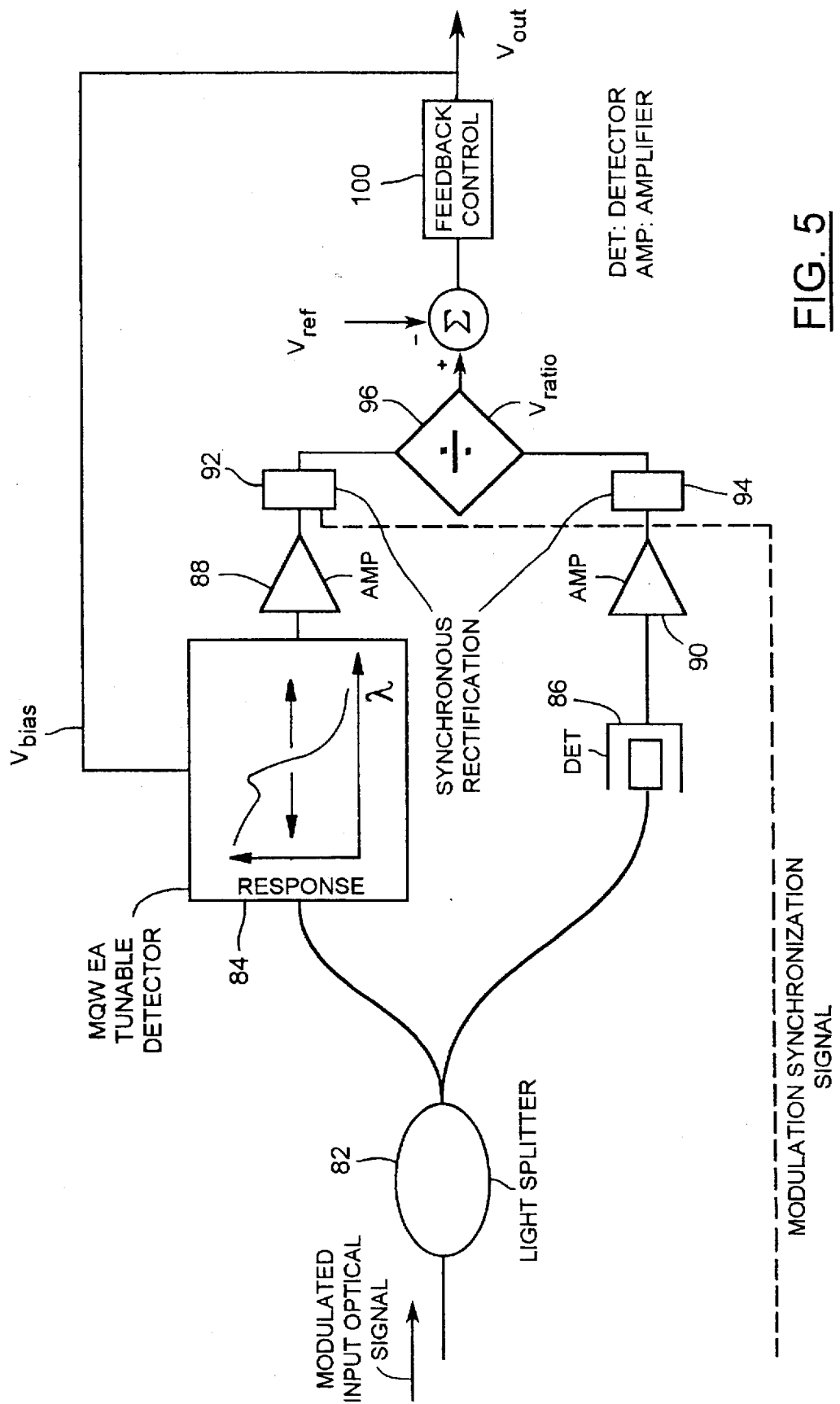
FIG. 5 is a block diagram of an active wavelength demodulation system using synchronous detection constructed in accordance with the present invention for which experimental results are presented in FIGS. 7 to 10.

Referring to FIG. 5, an active wavelength demodulation system based on synchronous detection with a multiple quantum well electroabsorption tunable filter based on two-detector tracking is shown at 80. The input optical signal passes through an optical beam splitter 82 with part of the signal input into a multiple quantum well electroabsorption (MQW EA) tunable filtering detector 84 and the other part into a reference detector 86. The output of filtering detector 84 is input into an amplifier 88 and the output of reference detector 86 is input into an amplifier 90. The outputs of amplifiers 88 and 90 are input into synchronous rectifiers 92 and 94 respectively. These synchronous rectifiers extract the portion of the corresponding input signals which varies at the same frequency as the modulation reference input, which is supplied by means of a modulation synchronization signal. The modulation reference input is of the same frequency and phase as the modulation of the input signal, so that the outputs of rectifiers 92 and 94 will be due to the input signals alone. The dark currents of the two detectors, particularly that of the QW EA photodiode, will be removed from the signal output from the rectifiers as they will be, in general, of a frequency different than the modulation frequency. The outputs of synchronous rectifiers 92 and 94 are ratioed in the analog divider or ratioing circuit 96. A ratiometric voltage signal, $V_{ratio}$, is obtained by ratioing the filtered output of filtering detector 84 and the unfiltered output of detector 86 detector signals to provide optical intensity self-referencing. This $V_{ratio}$ output signal is continuously compared with a reference voltage signal, $V_{ref}$ and the difference of $V_{ratio}$ and $V_{ref}$ are input into a feedback control circuit 100.

Figure 6:
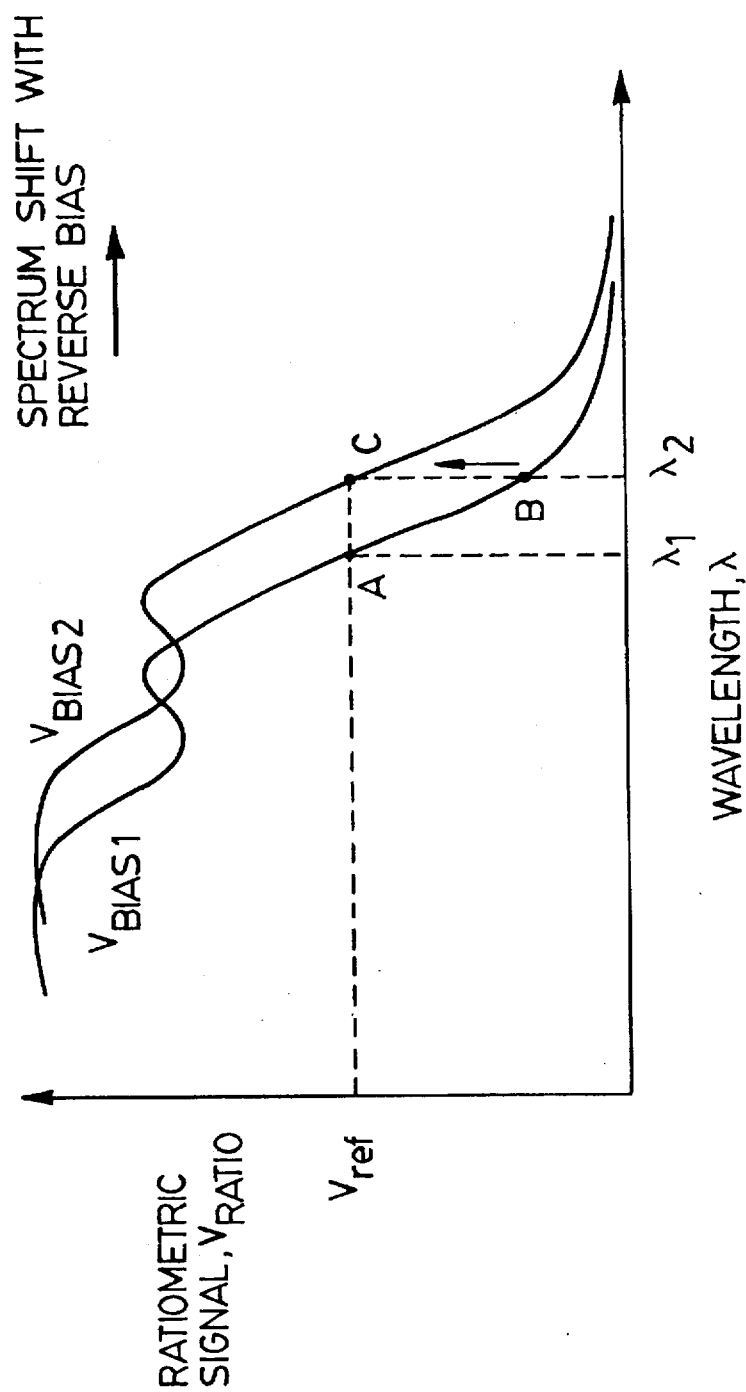
FIG. 6 is a system state diagram illustrating how the system of FIG. 5 tracks the wavelength of an input light signal.

Referring now also to the system state diagram of FIG. 6, when $V_{ratio}$ equals $V_{ref}$, the system is in equilibrium (state point A), and the feedback control circuit 100 produces a bias voltage to the filter/detector 84 of $V_{bias1}$. If the input optical signal changes from wavelength $\lambda_1$ to $\lambda_2$, $V_{ratio}$ will drop below $V_{ref}$ state point B). The fe(state point B). The feedback control circuit reverse bias voltage, applied to the filter/detector 84, thereby shifting the spectral response of detector 84 until equilibrium is reestablished (state point C) with a new $V_{bias2}$ applied across the quantum well diode. The magnitude of the bias voltage,$V_{bias1}$ applied to filter/detector 84 is taken as the output voltage, $V_{out}$ from which the input wavelength can be determined.

The use of synchronous detection in the system of FIG. 5 is advantageous because it provides an added benefit of improved signal-to-noise ration in system by acting to filter out noise components of frequencies different than that of the modulation imposed on the input signal. This is very advantageous for measuring low power input signals. However, this requires that the input light signal be modulated either by inserting a light chopper at the front of the system, or some other mechanism.

Figure 7:
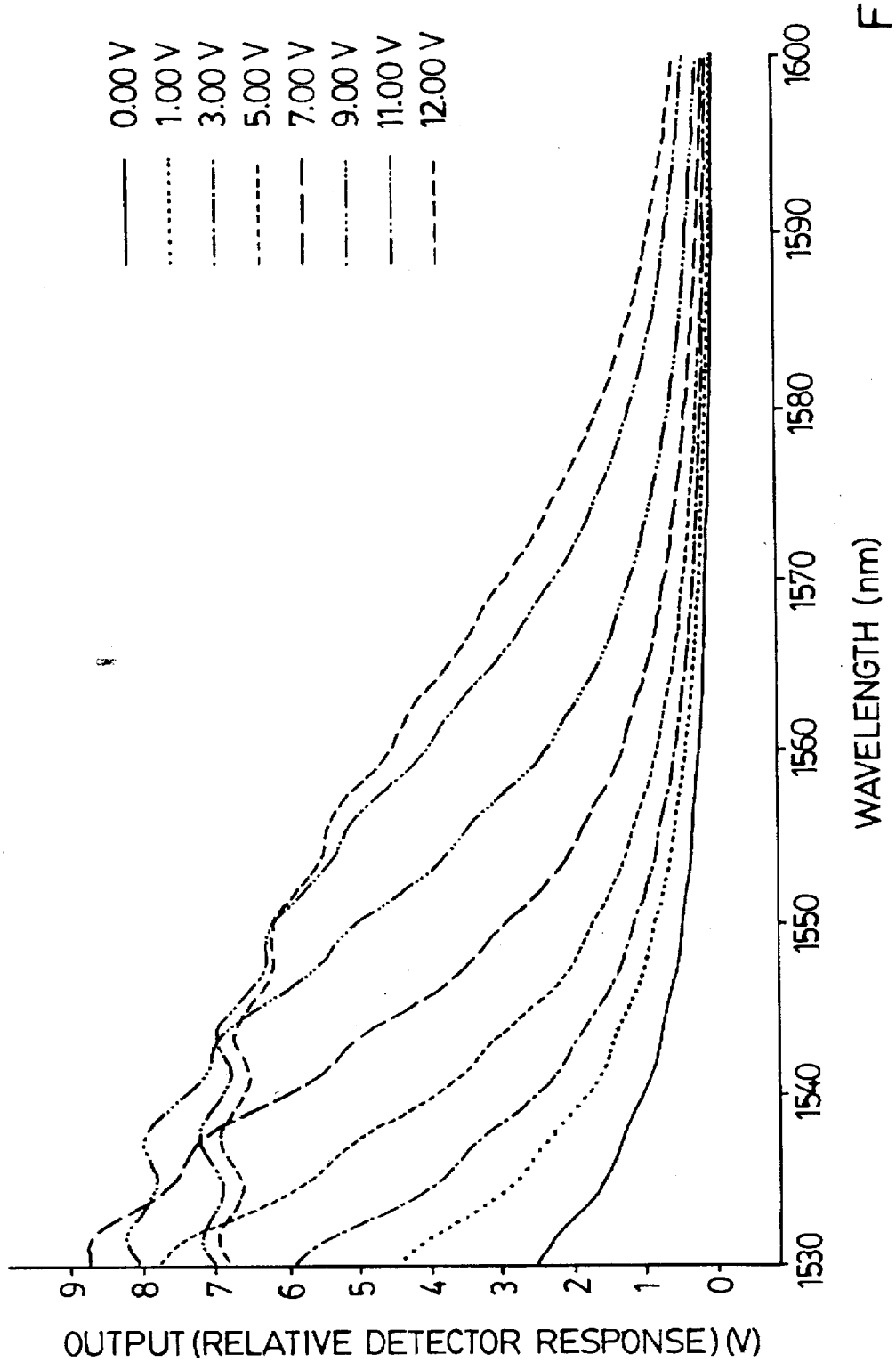
FIG. 7 shows the open circuit wavelength response showing output voltage of the divider versus wavelength (with the different bias voltages indicated in the legend) for the system of FIG. 5 using the QW photodiode shown in FIGS. 1 and 2, temperature controlled to 30.05° C.

FIG. 7 shows the open loop wavelength response for system 80 which makes use of the mesa InGaAsIInP MQW photodiode of FIG. 1 where the output voltage of the divider, representing the relative detector response, is plotted against wavelength. This data was taken by running the system of FIG. 5 in open loop mode (feedback from output disconnected) with the divider output as the output of the system. There is some modulation apparent on the curves in FIG. 7 due to the Fabry-Perot effect since the QW photodiode was not provided with an antireflection coating. The curves of FIG. 7 illustrate the wavelength and bias potential dependence of the QW detector in addition to representing an example of an open loop measurement system previously discussed.

Figure 8:
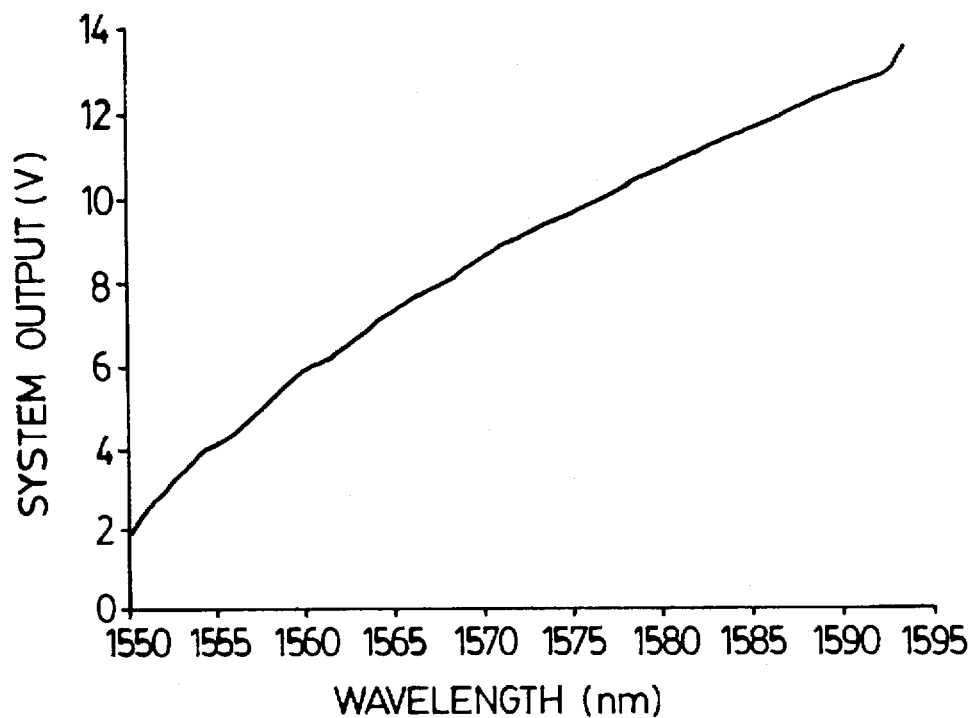
FIG. 8 shows the wavelength response, system voltage output versus wavelength for the filtering detector of FIG. 5 operating in closed loop (tracking) mode with a ratio lock point of 1.002 V and an average measurement resolution for this lock point of ±8.33 picometers.
Figure 9:
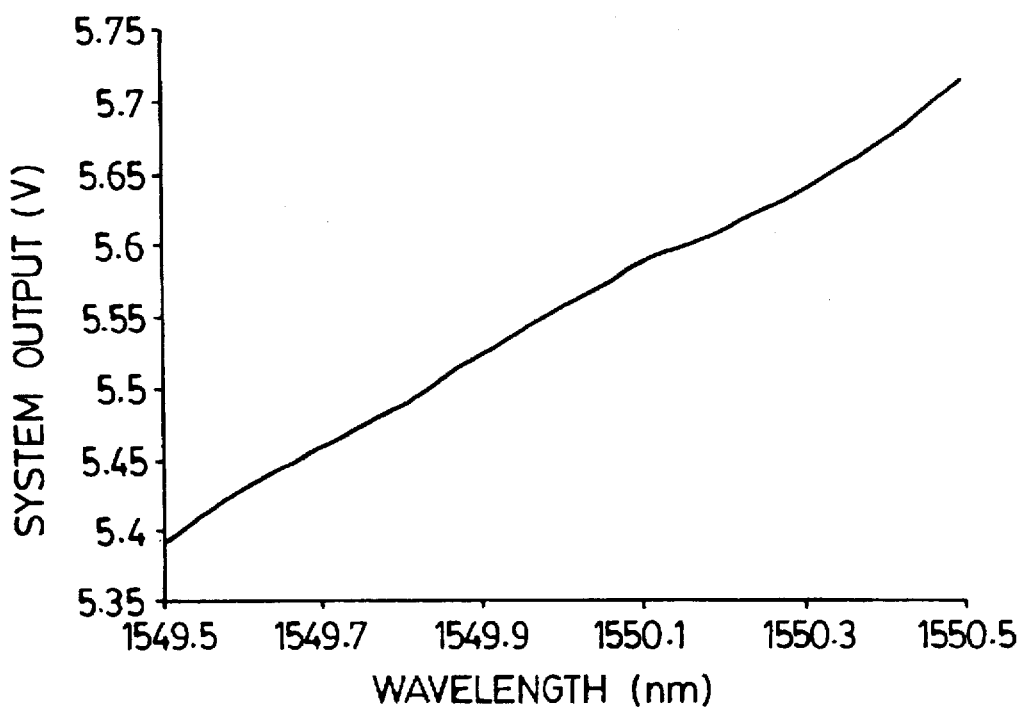
FIG. 9 is similar to FIG. 8 but with a ratio lock point of 2.012 V and for this lock point the measurement resolution is +6.39 picometers.

FIG. 8 shows the wavelength response, system voltage output versus wavelength for the closed loop system of FIG. 5 operating in closed loop (tracking) mode with a ratio lock point of 1.002 V and an average measurement resolution for this lock point of ±8.33 picometers. FIG. 9 is similar to FIG. 8 but with a ratio lock point of 2.012 V and for this lock point the measurement resolution is ±6.39 picometers. These results show that the system is capable of wavelength measurement with better than 10 picometer resolution.

Figure 10:
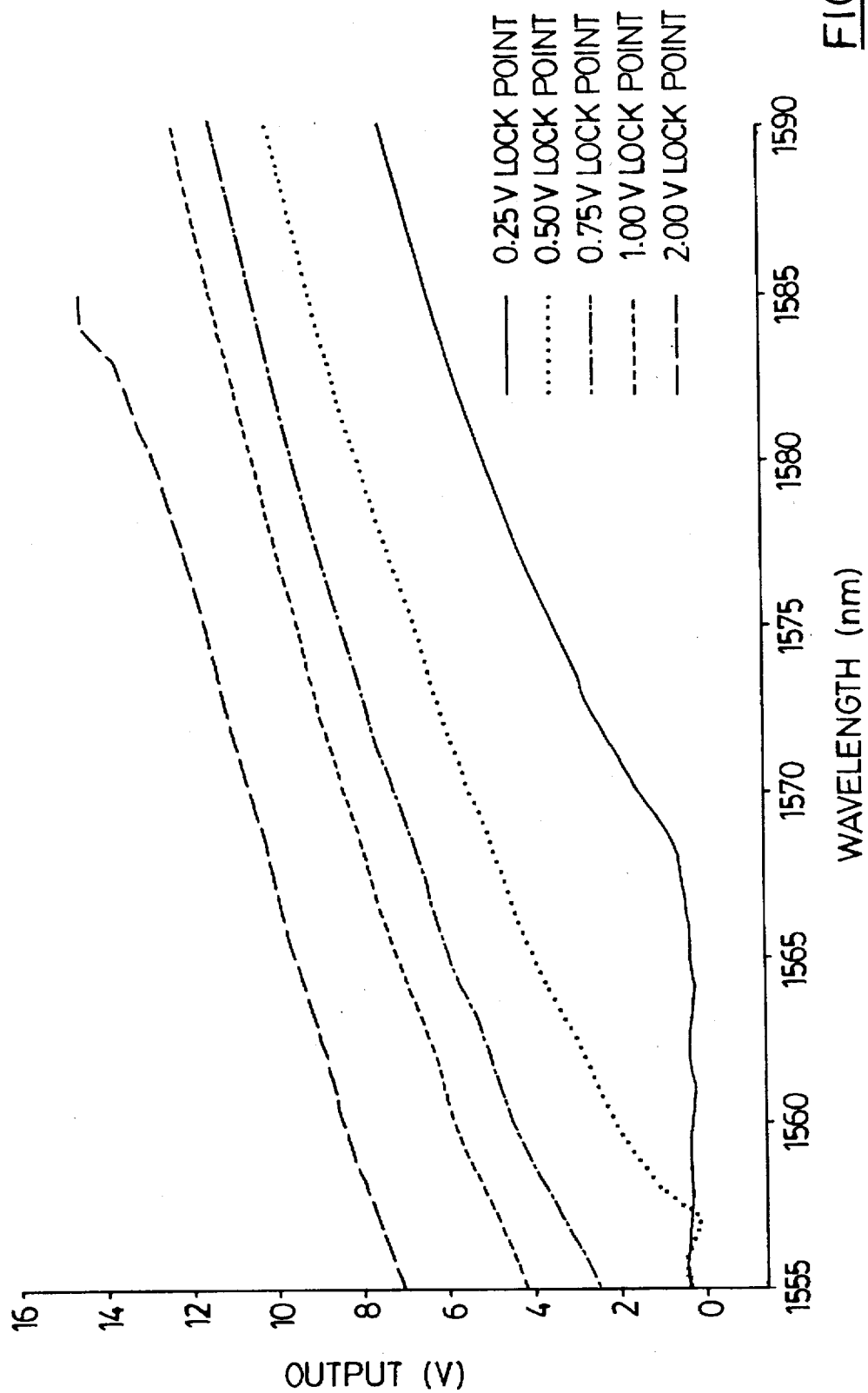
FIG. 10 is similar to FIGS. 8 and 9 and shows the closed loop (tracking) wavelength response for various system lock points using synchronous detection with the QW diode structure of FIG. 1.

Referring to FIG. 10 the lockpoint is $V_{ref}$ if a horizontal line were drawn on the open loop plot of FIG. 7 at the lock voltage, the closed loop response would be the set of bias voltages required to have the open loop curves intersect this horizontal line at the wavelengths being measured.

It will be understood that because the detector response of the QW EA of the filtering detectors forming the subject invention is controlled by changing the reverse bias across the QW photodiode, the dark current, or leakage current, of the filtering detector is constantly changing with change in bias potential. A means is therefore desired to subtract out ("null") this dark current at any given applied bias voltage, so that the output signal from the filtering detector is a result of the photocurrent alone. Described hereinafter are three different approaches by which this dark current nulling may be achieved.

In the first method, a chopper system or some other method may be implemented in order to modulate the input light to the detector system. When the input light to the detector system is periodically blocked, a reference measurement of the signal from the filtering detector may be taken. This reference measurement represents the dark current, and so its value may be subtracted from the signals taken from the detector when the input light is unblocked, until a new dark current reference measurement is sampled. This is referred to as a sample-and-hold approach. One may also use a synchronous detection approach whereby signals of the proper modulated frequency are extracted from the signal as a whole so that the desired photocurrent signals pass through and are rectified back to non-modulated signals, while dark currents and signal noise of frequencies other than the modulation frequency are filtered out. It will be understood that for a closed loop (tracking) system, the periodic sampling of the dark current must be performed at an effectively higher rate in comparison to the speed at which the bias on the filtering detector is changed.

The second method relies upon a lookup table which may be used for the filtering detector. In this method the dark current for any given applied bias potential is stored as a calibration. The applied bias then is continually fed to the lookup table, to produce the appropriate dark current to be subtracted from the current produced by the filtering detector.

Another method of dark current compensation comprises fabricating twin filtering detectors on a common substrate, with light being input to only one of the detectors. The same reverse bias is continually applied to both filtering detectors. With the two identical detectors having substantially the same dark current versus reverse bias potential characteristics, then by subtracting the currents of the two devices permits intrinsic dark current nulling in a simple manner. This method is the preferred method of the three discussed herein, and is more fully described in U.S. Pat. No. 5,410,145, issued to Coroy, "Light Detector Using Reverse Biased Photodiodes with Dark Current Compensation", which is incorporated herein by reference.

The photodiodes are fabricated as part of an integrated circuit in close enough proximity to each other on the same substrate such that they both experience substantially the same environmental conditions. Therefore, those temperature and other environmental fluctuations which affect the dark current flowing through the two photodiodes will affect them both to the same or closely similar degree so that the resultant dark current increase or decrease is common to both photodiodes and is intrinsically nulled by the circuits. This is particularly advantageous when photocurrents are of the same order of magnitude or lower than the dark currents flowing through the photodiodes.

The required degree of separation of the two photodiodes will depend in part on the application for the detector. Higher sensitivity is achieved the closer the photodiodes are to each other since the probability increases that each will experience the same environment. Further, properties of the substrate, such as thermal conductivity, are also important in determining the separation of the photodiodes. The higher the thermal conductivity of the substrate, the farther apart the photodiodes may be fabricated since thermal fluctuations will be transmitted. This intrinsic method of dark current nulling is advantageous over for example the system using a chopper because it is much more compact.

It is to be noted that if the dark currents are very small compared to the photocurrents, it may be possible to simply neglect the dark currents. This assumption however breaks down when the photocurrents are of similar magnitude to the dark currents whereupon dark current nulling becomes important.

Figure 11:
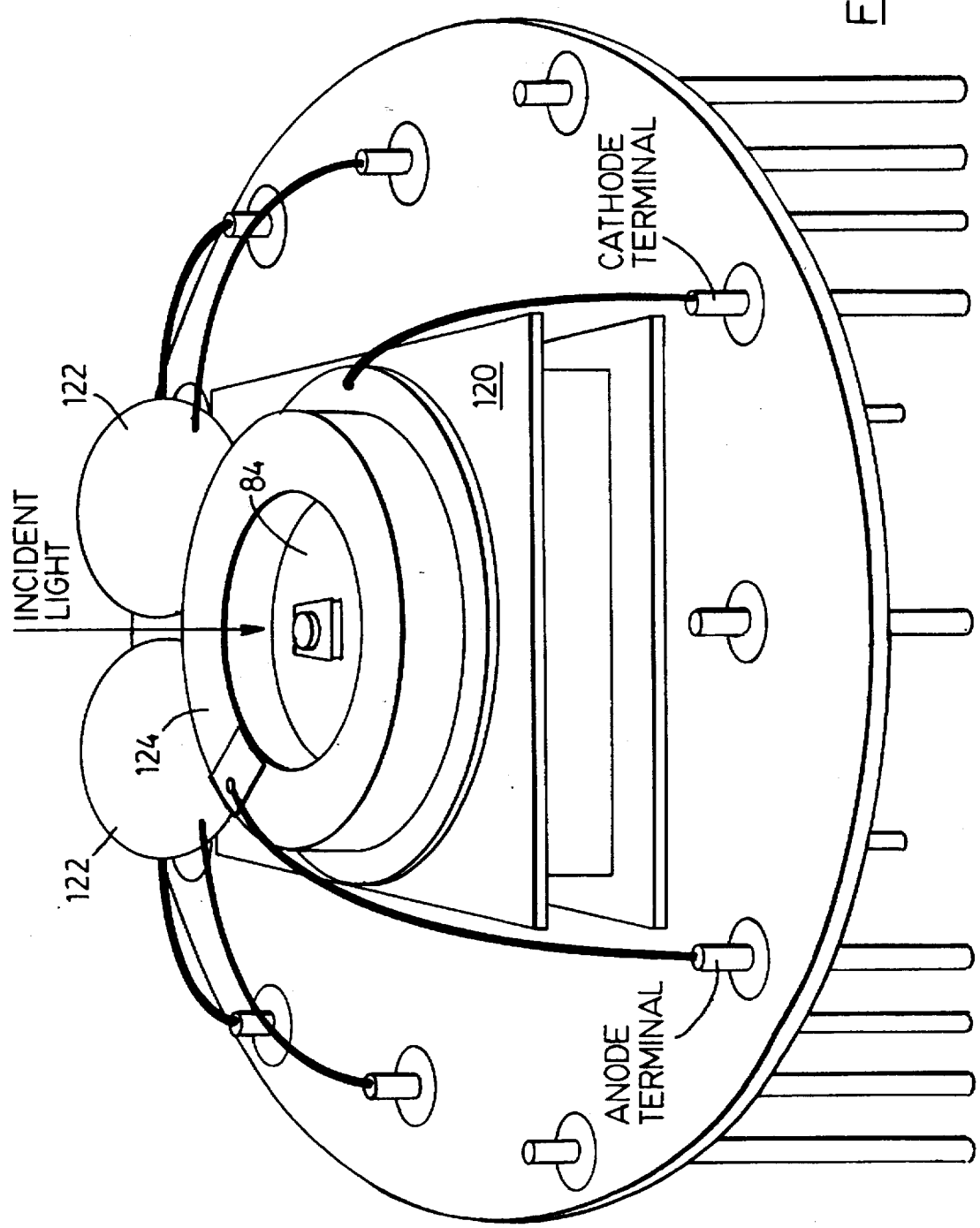
FIG. 11 shows an example of packaging a QW filtering detector which is temperature controlled.

It will be appreciated that the characteristics of semiconductor devices are very sensitive to temperature. Therefore, temperature compensation is necessary for the QW EA filtering detector. Two basic approaches are noted here. Referring to FIG. 11, in one method, the temperature of the detectors, particularly the filtering detector 84, shown at the center of a silicon protective ring 124 may be controlled using a thermoelectric cooler (TEC) 120 or other heating and/or cooling source and a temperature sensor, e.g. thermisters 122 using microprocessor control. Note that wavelength precision of the system may be limited by temperature stability but reliable results are obtained using this method. All data shown herein was obtained using this approach with temperature stabilities of 0.01° C. or better.

In another method of temperature control, Instead of controlling the temperature per se, the temperature of the detectors (most particularly the filtering detector) may be monitored by a temperature sensor, and the output of the system continually adjusted according to the temperature of the device. In this approach, one measures the wavelength assuming a given temperature, and then the output is corrected for any deviations from that assumed temperature. This requires that the filtering detector is calibrated over the operating temperature range and the calibration data is stored. During measurement, the temperature is constantly sensed and input into a microprocessor for comparison.

Combinations of the two above approaches are may also be used. It is to be noted that it may be problematic to get a temperature sensor close enough to the actual device so that an accurate measurement can be obtained. One solution to this problem is to monitor the dark current of the OW EA device, or of a reference device, for temperature shifts. This may be done for standard conditions (a given bias applied) or using a lookup table.

Different embodiments for detection devices for measuring various properties of a light signal have been disclosed. More particularly, detection systems for wavelength and power demodulation system based on a quantum well electroabsorption filtering detector has been described. Such systems are extremely advantageous for use in single wavelength optical multimeters, that is, with optical multimeters dealing with only one narrow linewidth input signal at a time. Such systems may be used as a building block for multiple wavelength optical multimeter systems.

In optical multimeter applications, the use of filtering detectors constructed in accordance with the present invention are advantageous over previously considered approaches for several reasons. Impinging the incident light on the quantum well perpindicular to the plane of the quantum well eliminates optical alignment problems associated with edge-on light incidence and provides polarization insensitivity. Since many filtering detectors can be fabricated on one substrate at once this provides for economic mass production with low unit cost per device. Wavelength measurement ranges preferably extend to as much as 100 nm or more with wavelength precision between 0.001 to 0.001 nm. Filtering detectors may be designed for various wavelength ranges each having a specified center wavelength. For example one detector may have a center wavelength around 1300 nm, another designed with for detection in a range around 1550 nm, and one for around 850 nm, depending on the particular application. The systems disclosed herein may be used in the front end of an optical multimeter. Such a compact optical multimeter would comprise a small packaged device including both filtering and reference detectors, temperature monitoring and/or control, and optionally a preamplification stage for use in various applications.

It will be appreciated by those skilled in the art that any of the circuit architectures disclosed herein may be used with synchronous detection, look-up tables, sample-and-hold, or intrinsic dark current nulling. Any of the architectures may use beam splitters, in-line detector alignment or in-line integrated circuit with the detectors constructed one on top of the other. Any of the circuit architectures may use a comparator or divider circuit approach for feedback mode operation and any of them may use a QW photodiode for the reference detector. Any of the temperature control and/or sensing methods may be used with all the circuit architectures and these combinations are considered to fall within the ambit of the subject invention. Thus, while an optical multimeter for wavelength and power demodulation using quantum well electroabsorption filtering detectors has been disclosed with respect to the embodiments disclosed herein, it will be appreciated that numerous variations of these embodiments may be made without departing from the scope of the invention.

I claim:

1. A device for measuring properties of an input light signal, comprising;

a) light signal detection means comprising a quantum well photodiode having at least one planar quantum well and an absorption edge, said light signal detection means having an output;

b) reference detection means having an output, and means for impinging a portion of an input light signal on said reference detection means and another portion of the input light signal on said light signal detection means at an effective angle with respect to said planar quantum well;

c) signal processing means, the outputs of the light signal detection means and reference detection means being connected to said signal processing means which combines said outputs in a preselected manner, said signal processing means having an output signal indicative of the combined outputs; and d) biasing means for biasing said quantum well photodiode for tuning the absorption edge of said quantum well photodiode.

2. The device according to claim 1 wherein said effective angle is substantially perpendicular to said planar quantum well.

3. The device according to claim 2 wherein said reference detection means is a photodiode.

4. The device according to claim 3 wherein said signal processing means comprises a first amplifier connected to the output of said quantum well photodiode and having an output, and a second amplifier connected to the output of said reference detection means and having an output.

5. The device according to claim 4 comprising a feedback control means having an input and an output, the output of said signal processing means being connected to the input of said feedback control means, wherein said biasing means for biasing said quantum well photodiode comprises the output of said feedback control means connected to said quantum well photodiode.

6. The device according to claim 1 wherein said reference detection means comprises a quantum well photodiode.

7. The device according to claim 5 wherein signal processing means includes a voltage divider having an output connected to said feedback control means, the outputs of said first and second amplifiers being connected to said voltage divider and the voltage divider output providing a ratio of the outputs of the first and second amplifiers.

8. The device according to claim 5 wherein said signal processing means includes a comparator having an output connected to said feedback control means, the outputs of said first and second amplifiers being connected to said comparator and the comparator providing an output which is substantially the difference of the outputs of the first and second amplifiers.

9. The device according to claim 8 wherein one or both of said first and second amplifiers is a variable gain amplifier.

10. The device according to claim 7 wherein said means for impinging a portion of said input light signal on said light signal detection means and said reference detection means comprises a beam splitter.

11. The device according to claim 8 wherein said means for impinging a portion of said input light signal on said light signal detection means and said reference detection means comprises a beam splitter.

12. The device according to claim 7 wherein said means for impinging a portion of said input light signal on said light signal detection means and said reference detection means comprises said light signal detection means and said reference detection means spatially arranged with respect to each other so that in operation said input light passes through a first of said light signal detection means and reference detection means whereby said input light signal is partially absorbed in the first detection means and the remainder is transmitted to the other detection means.

13. The device according to claim 8 wherein said means for impinging a portion of said input light signal on said light signal detection means and said reference detection means comprises said light signal detection means and said reference detection means spatially arranged in-line with respect to each other so that in operation said input light passes through a first of said light signal detection means and reference detection means whereby said input light signal is partially absorbed in the first detection means and the remainder is transmitted to the other detection means.

14. The device according to claim 13 wherein said light signal detection means and reference detection means are formed onto a common substrate, one being located on top of the other.

15. The device according to claim 7 wherein said quantum well photodiode include temperature sensing means, including calibration means for compensating said output of the light signal detection means for deviations in the temperature of said light signal detection means from a preselected temperature.

16. The device according to claim 8 wherein said quantum well photodiode and said reference photodiode include temperature sensing means, including calibration means for compensating said output of the light signal detection means for deviations in the temperature of said light signal detection means from a preselected temperature.

17. The device according to claim 7 comprising temperature control means for controlling the temperature of the quantum well photodiode.

18. The device according to claim 8 comprising temperature control means for controlling the temperature of the quantum well photodiode.

19. The device according to claim 17 wherein said temperature control means comprises a thermoelectric cooler and temperature sensing means for sensing the temperature of the quantum well photodiode, said quantum well photodiode being mounted on said thermoelectric cooler.

20. The device according to claim 18 wherein said temperature control means comprises a thermoelectric cooler and temperature sensing means for sensing the temperature of the quantum well photodiode, said quantum well photodiode being mounted on said thermoelectric cooler.

21. The device according to claim 7 wherein said signal processing means comprises a first synchronous rectification means connected to the output of said first amplifier and a second synchronous rectification means connected to the output of said second amplifier, said first and second synchronous rectification means having outputs connected to said voltage divider.

22. The device according to claim 8 wherein said signal processing means comprises a first synchronous rectification means connected to the output of said first amplifier and a second synchronous rectification means connected to the output of said second amplifier, said first and second synchronous rectification means having outputs connected to said comparator.

23. The device according to claim 4 wherein said biasing means is an external voltage biasing means wherein a preselected bias voltage is applied to said quantum well photodiode in operation.

24. The device according to claim 23 wherein said signal processing means is a voltage divider circuit having an output indicative of wavelength of the input light signal impinging on said quantum well photodiode.

25. The device according to claim 12 wherein said light signal detection means and reference detection means are formed onto a common substrate, one being located on top of the other.

26. The device according to claim 7 wherein said reference photodiode includes temperature sensing means.

27. A device for measuring properties of a light signal, comprising;

a) a filtering detector comprising a quantum well photodiode having an absorption edge, at least one substantially planar quantum well and an output;

b) a reference photodetector having an output;

c) means for impinging a portion of an input light signal on said reference photodetector and another portion of the input light signal on said quantum well photodiode at an angle substantially perpendicular to said planar quantum well;

d) a signal processing means, the outputs of the filtering detector and the reference photodetector being connected to said signal processing means which combines said outputs in a preselected manner, said signal processing means having an output signal indicative of the combined outputs; and e) biasing means for biasing said quantum well photodiode for tuning the absorption edge of said quantum well photodiode.

28. The device according to claim 27 wherein said reference photodetector is a reference photodiode, and wherein said quantum well photodiode and said reference photodiode are integrally formed on a substrate in close enough proximity that both photodiodes experience substantially the same environment, both photodiodes having preselected scale and structure.

29. The device according to claim 28 wherein said signal processing means comprises a first amplifier connected to the output of said quantum well photodiode and having an output, and a second amplifier connected to the output of said reference photodiode and having an output.

30. The device according to claim 29 comprising a feedback control circuit having an input and an output, the output of said signal processing means being connected to the input of the feedback control circuit, wherein said biasing means for biasing said quantum well photodiode comprises the output of said feedback control circuit connected to said quantum well photodiode.

31. The device according to claim 30 wherein said signal processing means includes a voltage divider circuit having an output connected to said feedback control circuit, the outputs of said first and second amplifiers being connected to said voltage divider and the voltage divider circuit output providing a ratio of the outputs of the first and second amplifiers.

32. The device according to claim 30 wherein said signal processing means includes a comparator circuit having an output connected to said feedback control circuit, the outputs of said first and second amplifiers being connected to said comparator and the comparator circuit providing an output which is substantially the difference of the outputs of the first and second amplifiers.

33. The device according to claim 32 wherein one or both of said first and second amplifiers is a variable gain amplifier.

* * * * *